United States Patent
Board et al.

(10) Patent No.: US 9,988,012 B2
(45) Date of Patent: Jun. 5, 2018

(54) SEAT BELT SYSTEM

(71) Applicant: Ford Global Technologies, LLC, Dearborn, MI (US)

(72) Inventors: Derek Board, Ferndale, MI (US); Srinivasan Sundarajan, Ann Arbor, MI (US); Edward Joseph DeSmet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 14/197,597

(22) Filed: Mar. 5, 2014

(65) Prior Publication Data
US 2015/0251626 A1    Sep. 10, 2015

(51) Int. Cl.
| | | |
|---|---|---|
| *B60R 22/12* | (2006.01) | |
| *B60R 21/18* | (2006.01) | |
| *B60R 22/18* | (2006.01) | |

(52) U.S. Cl.
CPC .............. *B60R 22/12* (2013.01); *B60R 21/18* (2013.01); *B60R 2022/1818* (2013.01)

(58) Field of Classification Search
CPC ................................ B60R 22/12; B60R 22/24
USPC ...... 280/801.1, 805, 806, 808; 297/482, 483
See application file for complete search history.

(56) References Cited

U.S. PATENT DOCUMENTS

| | | | |
|---|---|---|---|
| 7,032,929 B2 | 4/2006 | Stanley et al. | |
| 7,092,744 B2 * | 8/2006 | Rodemer et al. | 455/569.1 |
| 7,104,570 B2 | 9/2006 | Hearn et al. | |
| 7,273,232 B2 | 9/2007 | Fontecchio et al. | |
| 7,806,439 B2 | 10/2010 | Clute | |
| 8,870,225 B2 * | 10/2014 | Han | 280/805 |
| 2005/0127660 A1 * | 6/2005 | Liu | 280/808 |
| 2006/0208471 A1 * | 9/2006 | Sundararajan et al. | 280/733 |
| 2007/0108755 A1 * | 5/2007 | Jones | 280/801.1 |
| 2007/0138783 A1 * | 6/2007 | Gleason et al. | 280/808 |
| 2009/0008919 A1 * | 1/2009 | Mather et al. | 280/807 |
| 2009/0256337 A1 * | 10/2009 | Pan | 280/733 |

FOREIGN PATENT DOCUMENTS

| | | |
|---|---|---|
| KR | 680723 B1 * | 2/2007 |
| KR | 100680723 B1 | 2/2007 |

OTHER PUBLICATIONS

David Dubois, Paul Silverthorne, Eric Markiewicz, "Assessment of Seat Belt Webbing Bunching Phenomena," International Journal of Impact Engineering, vol. 38, Issue 5, May 2011, pp. 339-357.

* cited by examiner

*Primary Examiner* — Darlene P Condra
(74) *Attorney, Agent, or Firm* — Burgess Law Office, PLLC; Frank A. MacKenzie

(57) ABSTRACT

A seat belt system including a seat belt secured for movement over a D-ring wherein the D-ring includes a magnet and the seat belt includes a plurality of magnetized metal filaments. As the seat belt travels through the D-ring the magnet attracts the plurality of metal filaments and counteracts at least a portion of the normal force of the webbing on the D-ring provided by gravity. The shape or configuration of the magnet may also increase the arc length or radial travel distance about the D-ring to reduce bunching and correspondingly the force necessary to wind and unwind the seat belt.

7 Claims, 6 Drawing Sheets

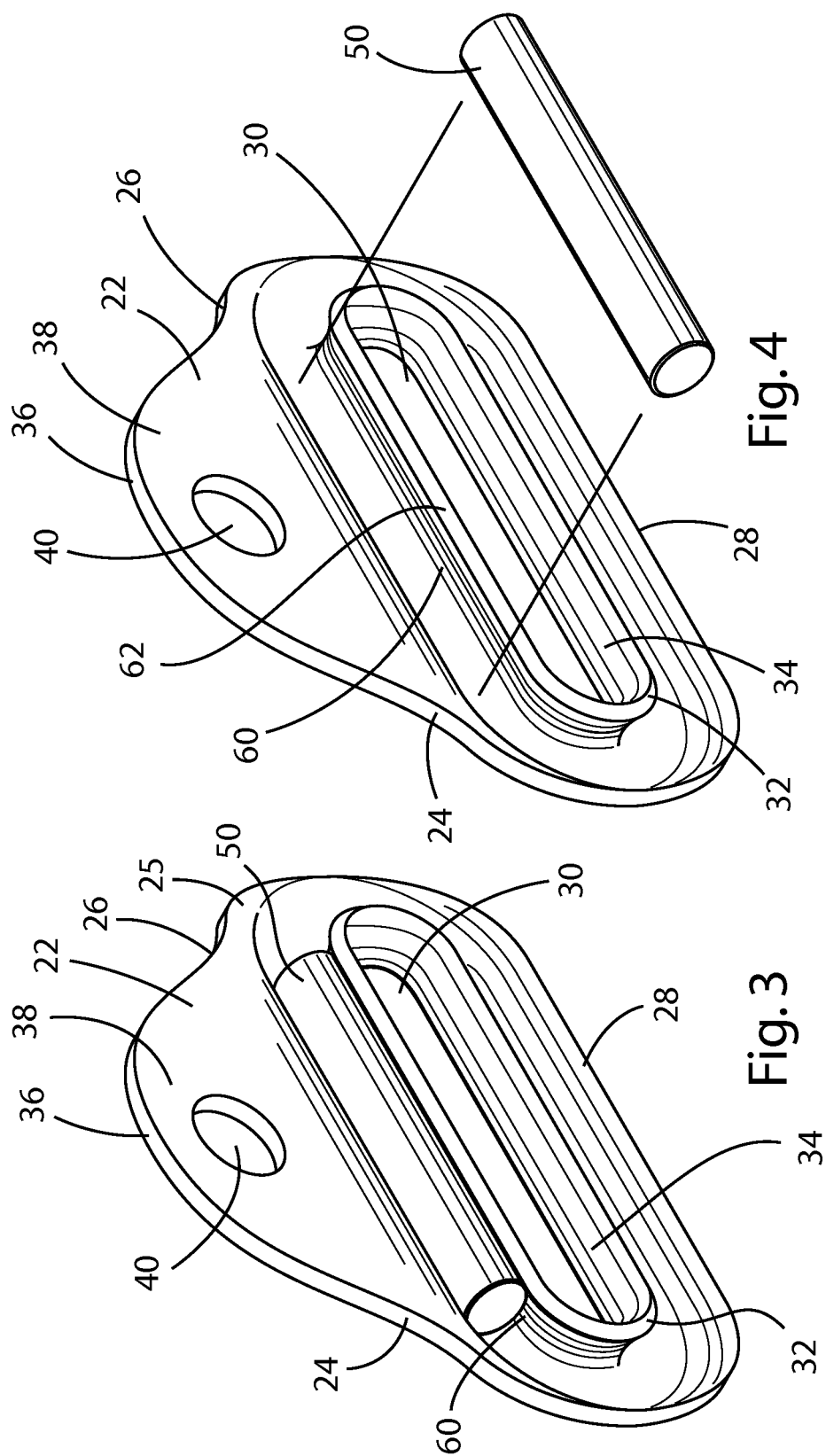

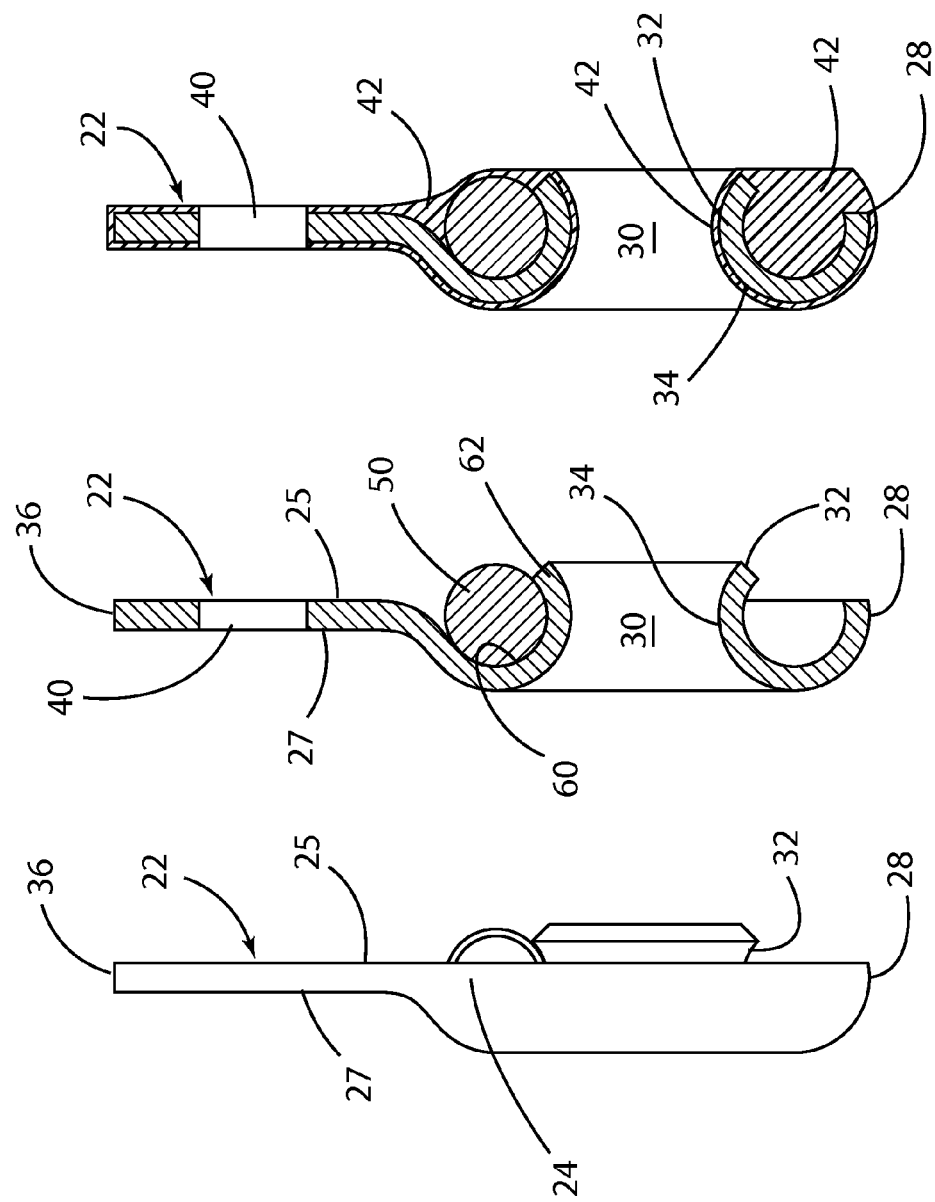

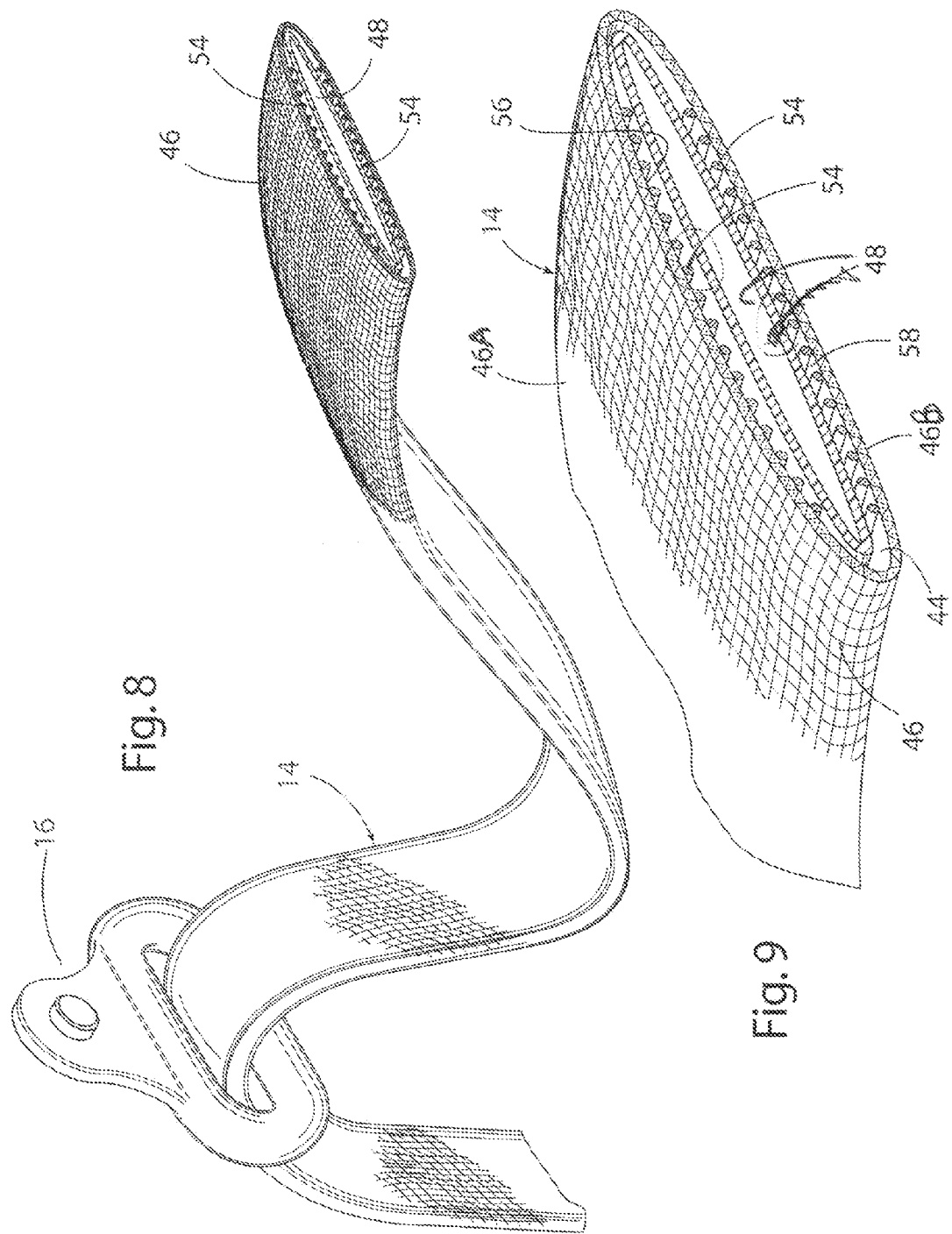

… …

SEAT BELT SYSTEM

CROSS-REFERENCE TO RELATED APPLICATIONS

Not Applicable.

BACKGROUND OF THE INVENTION

1. Field of the Invention

The present invention relates generally to a seat belt system for restraining an occupant of a vehicle and, more particularly, to a D-ring used to attach the shoulder portion of a seat belt in an automobile body assembly.

2. Description of Related Art

One type of seat belt system connects at three places to the vehicle body and incorporates both a lap belt section and a shoulder belt section to restrain movement of an occupant should sudden vehicle deceleration occur, for example a collision. The seat belt extends upward from a seat belt retractor, typically anchored to the vehicle body, to and through a D-ring, anchored to the vehicle body. The seat belt extends across the occupant's body and with a tongue received in a buckle securing the seatbelt in place.

Various types of seat belt retractors are commonly used. One type of seat belt retractor includes a spool or reel including a torsion spring used to wind up and store the webbing of a seat belt. Some retractors use a motor that operates to wind and unwind the seat belt. As the seat belt is withdrawn or unwound from the spool or reel, it passes over the D-ring. Upon retraction, the seatbelt moves again over the D-ring in the opposite direction.

The seat belt retractor provides sufficient force to retract the seat belt through the D-ring until it reaches a fully withdrawn position. To fasten the seat belt, the vehicle occupant exerts a force that overcomes the retraction force whereby the occupant can withdraw or pull the seat belt out of the seat belt retractor, over the D-ring, across the occupant's body and place the tongue in the buckle. Once buckled the seat belt retractor exerts a certain retraction force to remove any slack from the seat belt, which depending upon the severity of the retraction force, may cause a feeling of confinement.

Reducing the retraction force needed to pull the seat belt back into the seat belt retractor and wind the seat belt around the spool reduces the pressure felt by the vehicle occupant during use.

SUMMARY OF THE INVENTION

An embodiment of the present invention provides a D-ring and seat belt for use with a seat belt assembly of a motor vehicle. The D-ring includes a magnet and the seat belt includes a plurality of metal filaments. The magnet and plurality of metal filaments act together to counteract at least a portion of the force needed to draw the seat belt over the D-ring. In one example of the present embodiment, the magnet is positioned over or above the seatbelt and provide an attraction force that counteracts at least a portion of the normal force of the seat belt on the D-ring caused by gravity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of a D-ring body and magnet according to the present invention.

FIG. 4 is an exploded perspective view of a D-ring body and magnet according to the present invention.

FIG. 5 is a side view of a D-ring body and magnet according to the present invention.

FIG. 6 is a cross-sectional side view of a D-ring body and magnet according to the present invention.

FIG. 7 is a cross-sectional side view of a D-ring assembly according to the present invention having a cover.

FIG. 8 is a perspective view of a D-ring and seatbelt according to the present invention.

FIG. 9 is a cross-sectional view of a seatbelt according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
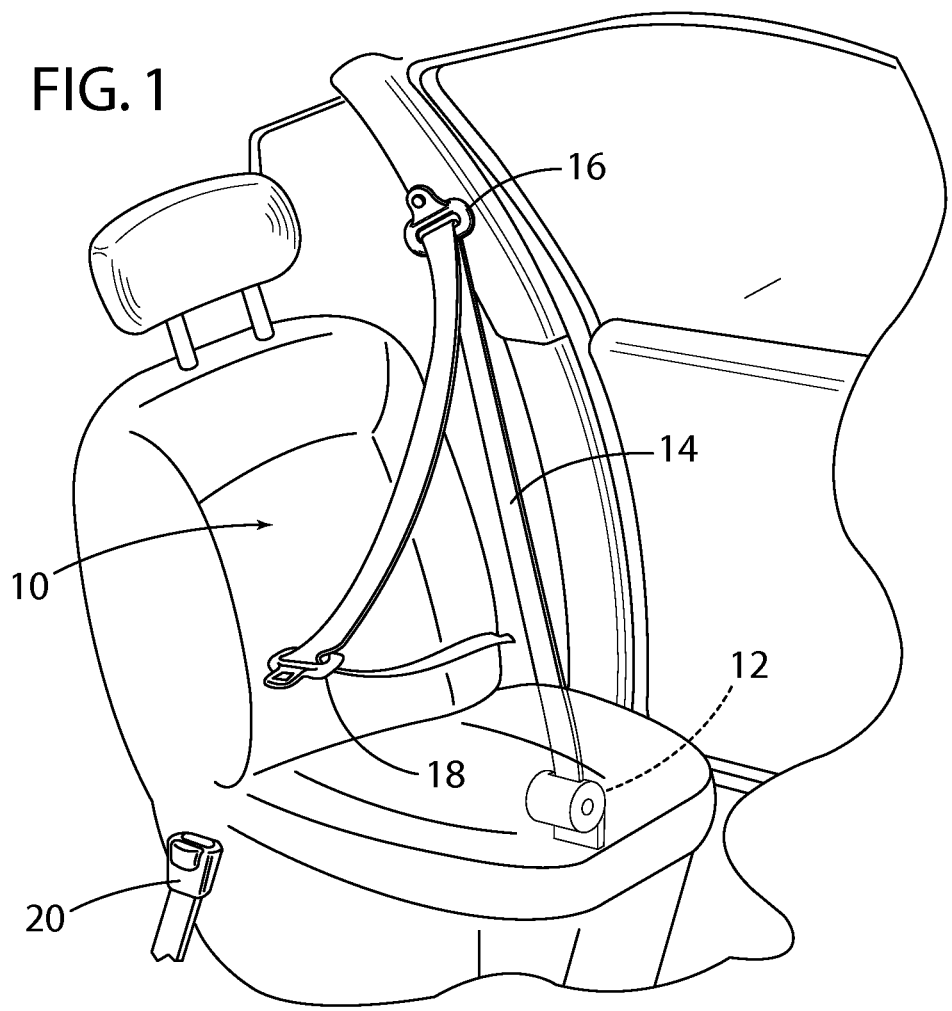
FIG. 1 is a perspective overview of a seat belt assembly incorporating a D-Ring and seat belt according to the present invention.
Figure 2:
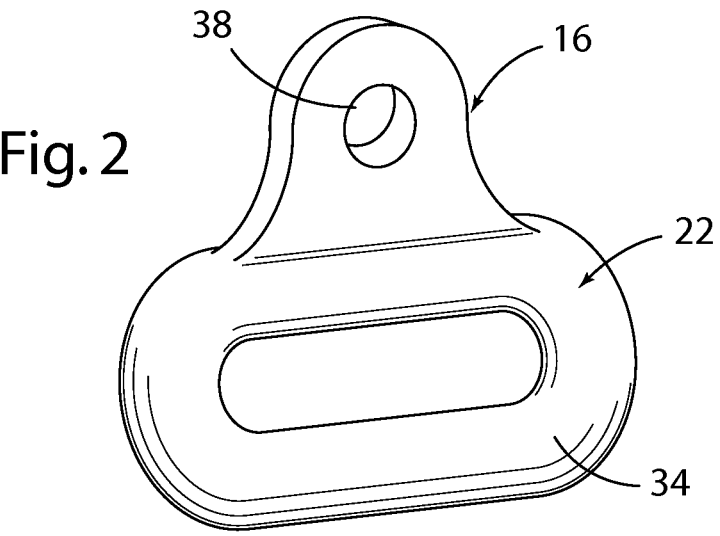
FIG. 2 is a perspective view of a D-ring according to the present invention.

FIG. 1 illustrates a seat belt system, seen generally at 10, according to one example of the present invention. The seat belt system includes a seat belt retractor 12. The seat belt retractor 12 typically operates to wind and unwind a seat belt 14 as the vehicle occupant pulls out and releases the seat belt 14. The retractor 12 operates to take up slack in the seat belt 14 and during periods of rapid deceleration, for example a collision, to lock and prevent extraction of the seat belt 14. As illustrated, the seat belt 14 passes through a D-ring 16 and a tongue 18. The tongue 18 freely slides along the seat belt 14 and connects the seat belt 14 to a buckle 20. In the disclosed system, one end of the seat belt 14 is fixed or anchored to the base/frame of the vehicle with the other end in the seat belt retractor 12. The foregoing description of a seatbelt system 10 notwithstanding, the present invention functions or works with other seatbelt systems; including those with guides on the seats, mid-guides on the sheet metal or mid-guides on the B-side of trim panels. Since the D-ring 16 is one mechanism used to guide a seatbelt 14 the present invention is also suitable for use with other types of seatbelt guides.

In the present example, the seat belt 14 is of a type having a bag-in-tube design; with an airbag 48, see FIG. 9, built into or incorporated within a shoulder portion U46 of the seat belt 14. The shoulder portion 46 of the seat belt 14 includes a tubular belt portion 44 with the airbag located and housed between the front 46A and rear 46B surfaces of the shoulder portion 46 of the seat belt 14. If a frontal collision occurs, the airbag 48 inflates and opens the split in the tubular portion 44 when deploying in front of an occupant. The present invention may also be used with a standard web style seatbelt. In the present example, the invention includes a magnet located in or adjacent the D-ring and metallic filaments in the webbing of seatbelt. The magnet and metallic filaments cooperate to decrease the drag or friction force between the seatbelt and D-ring.

As illustrated FIGS. 2-7, the D-ring 16 has a generally triangular shaped body 22 having side portions 24, 26 with a base or bottom portion 28. The body 22 may be formed from a plate-like member and include a front face 25 and an opposing rear face 27. An opening or slot 30 extends between the respective front face 25 and rear face 27. In the present example, a stamping or press operation forms a flange or member 32 in the plate-like member adjacent the opening 30. The flange or member 32 extends laterally on both sides of the front face 25 and rear face 27 of the body 22. The flange 32 may extend laterally from only one of the front face or rear face 25, 27.

The flange 32 extending adjacent the opening 30 includes a guide surface 34. The guide surface 34 having an arcuate configuration or curvature to facilitate movement of the seatbelt over the guide surface 34. The curvature and the length of the guide surface 34 configured for each specific use. Further, increasing the size or length of the guide surface 34 correspondingly increases the width and the packaging constraints of the D-ring 16. The width, that is the distance between the respective ends of the flange 32 on the front and rear faces 25, 27, maybe limited depending upon the vehicle in which the D-ring 16 is used.

The top portion 36 of the body 22 includes an attachment portion 38 that includes an aperture 40 used to pivotally attach the D-ring 16 to the vehicle or vehicle frame. In the present example, the body 22 also includes a cover 42; see FIG. 7, typically formed of a polymer that provides an aesthetically pleasing appearance and a low friction surface on the lower or guide surface 34.

The seatbelt 14 travels over the guide surface 34 when pulling the seatbelt 14 from the retractor or drawing the seatbelt back into the retractor. When traveling over the guide surface 34 the tubular portion 44 of the shoulder portion 46 of the seatbelt 16 containing the airbag 48 bunches upon entering and exiting radial turns; for example when traveling around or pulled over an arcuate surface having a tight radius. To combat and overcome the tendency to bunch, the D-ring 16 according to one example of the present invention includes a magnet 50 housed on or in a portion of the D-ring 16 opposite the guide surface 34. The seat belt 14 includes a plurality of metal fibers or filaments 54 in or attached to the webbing of the seat belt 14. As illustrated the shoulder portion 46 of the seat belt 14 includes metal fibers or filaments 54 on the interior surface 56, 58 of the front and rear surfaces 46A, 46B of the shoulder portion 46. The metal fibers or filaments 54 extend along the longitudinal axis of the shoulder portion 46. The magnet 50 acts on the metal fibers or filaments 54 in the shoulder portion 46 of the seat belt 14 to counteract the normal force on the D-ring 16 applied by gravity.

In the example of the present invention, the magnet 50 is in a groove or channel 60 formed by an upper portion 62 of the flange 32. Positioning the magnet 50 opposite and spaced from the guide surface 34 enables it to act on the metal fibers or filaments 54 in the shoulder portion 46 of the seat belt 14 to lift the shoulder portion 46 of the seat belt 14 as it travels through the D-ring 16. Lifting the shoulder portion 46 negates adverse effects related to bunching when the shoulder portion 46 containing the airbag 48 is drawn over the D-ring 16.

Figure 10:
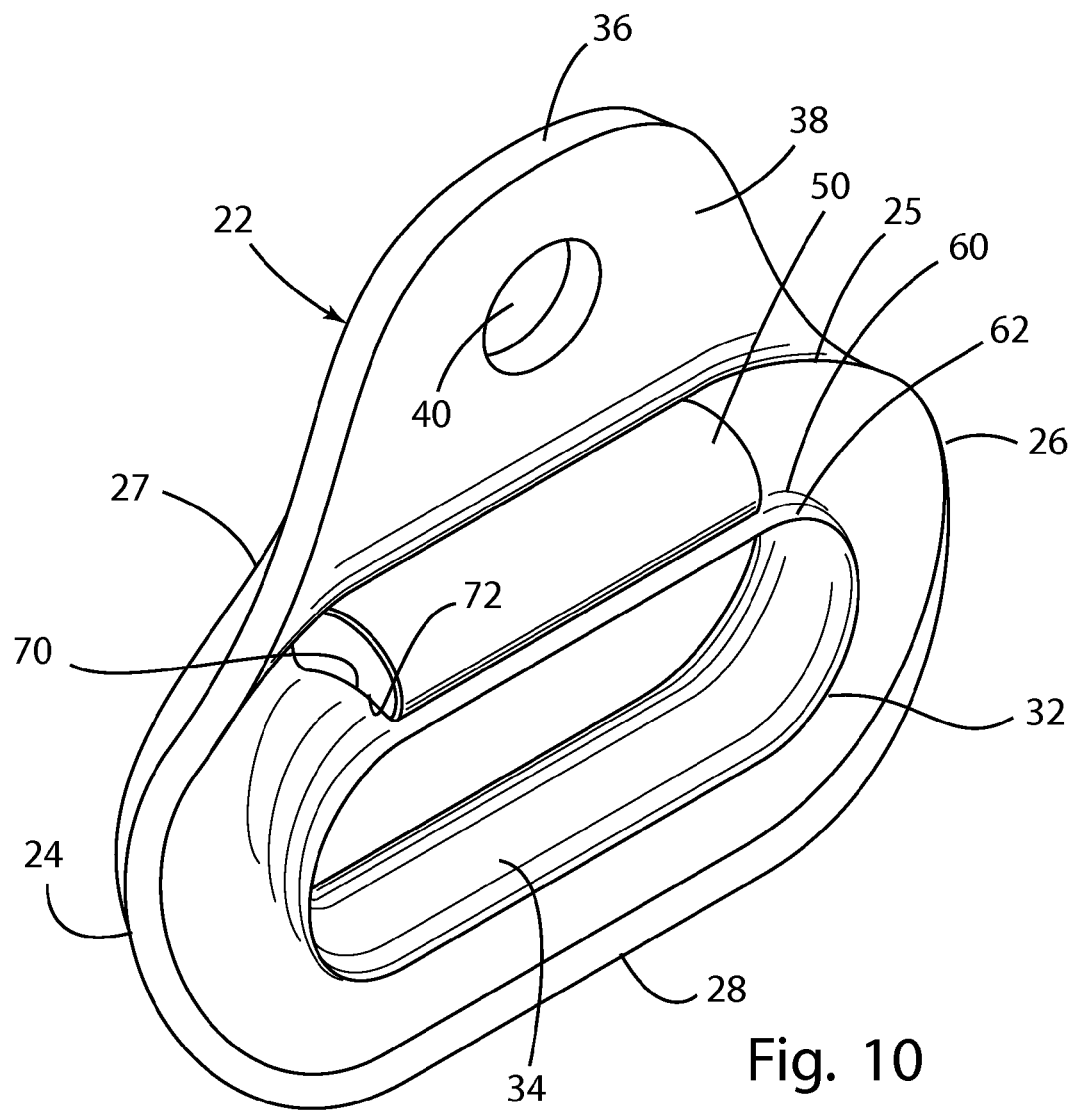
FIG. 10 is a perspective view of an alternative embodiment of a D-ring body and magnet according to the present invention.
Figures 11, 12:
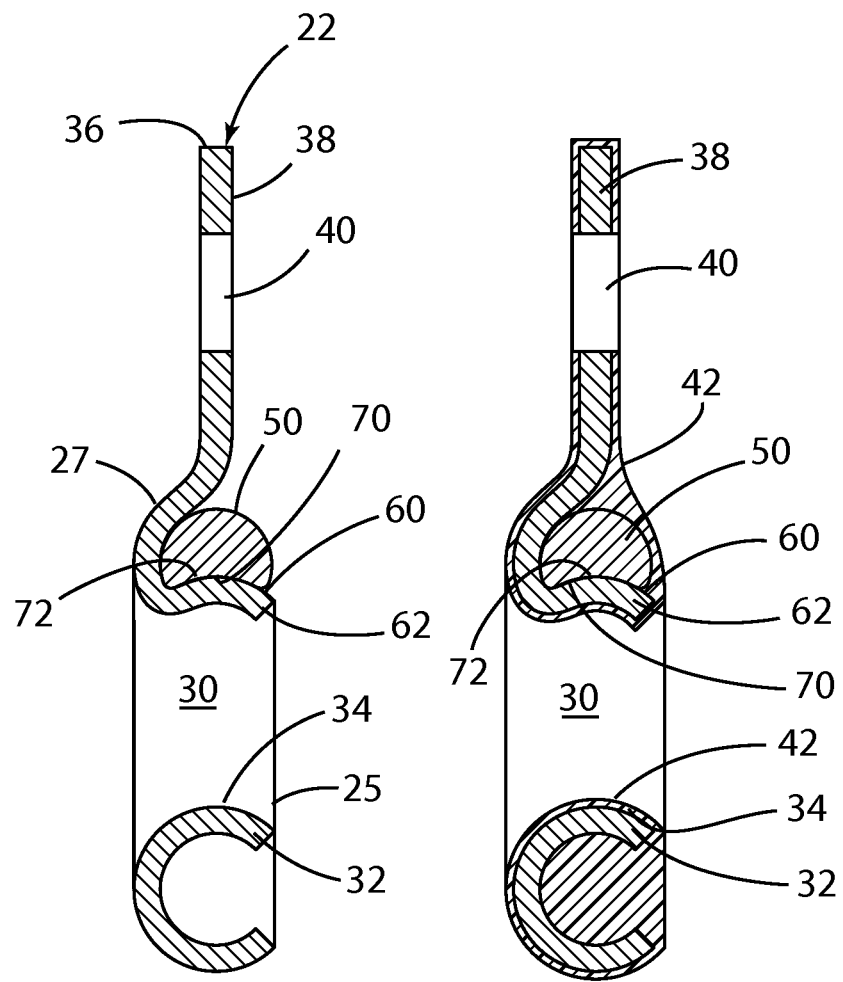
FIG. 11 is a cross-sectional side view of the D-ring body and magnet illustrated in FIG. 10.
FIG. 12 is a cross-sectional side view of the D-ring body and magnet as set forth in FIG. 10 including a cover.

FIGS. 10-12 illustrated a further example, wherein configuration, placement and number of magnets 50 housed in the D-ring 16 in combination with the metal fibers or filaments 54 in the shoulder portion 46 of the seat belt 14 increases the arc length or radius of curvature (r) of the seat belt 14. Increasing the radius of curvature (r) makes it easier for the seat belt 14, including the shoulder portion 46 to travel over the guide surface 34. In this manner the radius of curvature is increased without having to make the guide surface 34 of the D-ring 16 substantially larger, that is increasing the width between the front and rear 25, 27 of the D-ring 16. The magnet 50 also helps to reduce friction between the D-ring 16 and the seat belt 14 since it acts against the normal force provided by gravity of the shoulder portion 46 of the seat belt 14 on the D-ring 16.

As illustrated, the magnet 50 in FIGS. 10-12 has a concave surface 70 complementary to the convex surface 72 of the upper portion 62 of the flange 32. In this manner, the concave surface 70 of magnet 50 extends laterally between the respective front and rear 25, 27 of the D-ring 16. The magnet configuration illustrated is but one example. The present invention contemplates using multiple magnets and multiple magnet configurations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat belt system comprising:
    A seat belt, said seat belt including a plurality of metal filaments; and a D-ring, said D-ring including a magnet, wherein said magnet counteracts at least a portion of a normal force of the seat belt on the D-ring.

2. A method of counteracting a normal force of a seat belt on a D-ring provided by gravity comprising the steps of:
    providing the D-ring with a magnet;
    providing the seat belt with a plurality of metal filaments; and
    using the magnet to act on the metal filaments and counteract at least a portion of the normal force of the seat belt on the D-ring.

3. The method as set forth in claim 2 including said seatbelt including an airbag.

4. The method as set forth in claim 2 including the steps of providing a guide surface on said D-ring;
    positioning said magnet on said the ring; and
    using said magnet to counteract the at least a portion of the normal force of the seat belt on the guide surface of said D-ring.

5. The method as set forth in claim 2 including the steps of:
    providing the D-ring with a guide surface;
    supporting the magnet on said D-ring in a position spaced from the guide surface; and
    using an attraction force between magnet and the metal filaments to counteract at least a portion of the normal force of the seat belt on the guide surface of the D-ring provided by gravity.

6. The method as set forth in claim 5 including the step of configuring the shape of the magnet to vary an arc length of seat belt travel about the guide surface of the D-ring.

7. A seat belt system comprising:
- a seat belt, said seat belt having a first side and a second side and an airbag located between said first side and said second side, a plurality of polarized metal filaments on said first side and said second side; and
- a D-ring, said D-ring having a guide surface and a magnet positioned adjacent said guide surface and said magnet having a polarity opposite that of said plurality of polarized metal filaments in said seat belt.

* * * * *